United States Patent [19]

Dubell et al.

[11] Patent Number: 5,481,867
[45] Date of Patent: Jan. 9, 1996

[54] COMBUSTOR

[75] Inventors: Thomas L. Dubell, Palm Beach Gardens; James H. Shadowen, Riviera Beach, both of Fla.

[73] Assignee: United Technologies Corporation, Hartford, Conn.

[21] Appl. No.: 200,479

[22] Filed: May 31, 1988

[51] Int. Cl.[6] .................................................... F02C 3/06
[52] U.S. Cl. .................... 60/39.36; 60/39.27; 60/39.29; 60/39.37
[58] Field of Search ............................. 60/39.36, 39.37, 60/732, 746, 39.29, 39.27, 39.23, 748

[56] References Cited

U.S. PATENT DOCUMENTS

| | | | |
|---|---|---|---|
| 4,255,927 | 3/1981 | Johnson et al. | 60/39.37 |
| 4,417,439 | 11/1983 | Sepulveda et al. | 60/746 |
| 4,499,735 | 2/1985 | Moore et al. | 60/746 |
| 4,696,157 | 9/1987 | Barbier et al. | 60/39.23 |
| 4,720,970 | 1/1988 | Hudson et al. | 60/39.36 |

Primary Examiner—Donald P. Walsh
Attorney, Agent, or Firm—Norman Friedland

[57] ABSTRACT

An annular combustor for a gas turbine engine is constructed to include a sector that has a reduced airflow distribution than the remainder of the circumference by supplying a reduced airflow in a judiciously located portion of the fuel nozzles and the single stage of radially ingested combustion airflow. This single stage circumferential zoned annular combustor serves to accommodate higher fuel/air ratios.

2 Claims, 3 Drawing Sheets

COMBUSTOR

DESCRIPTION

1. Technical Field

This invention relates to gas turbine engines and particularly to the annular combustor.

2. Background of the Invention

As is well known the combustors for gas turbine engines have, from a technical standpoint, made significant advances in the state of the art over recent years. Combustor efficiency, for example, for aircraft jet engines operates in the high 90 percentile. Additionally, the technology has made significant improvement in reducing or eliminating pollutants and/or smoke emanating from the combustion process.

However, the requirements for combustors that are intended to meet demands for future aircraft needs will require even further advances in combustor technology. Obviously, aircraft engine performance is predicated on attaining high turbine inlet temperatures. Higher inlet turbine temperature, within a given limit, will manifest into improved thrust-to-weight ratios and specific fuel consumption with a consequential improvement in engine performance.

Thus, future demands will require that the advanced combustion system attendant these high performance engines will have to operate at a temperature rise at high power that is significantly higher than that of state-of-the-art combustors. However, it is of paramount importance that the designer of the combustor meets the increased temperature rise requirement without degrading heretofore established levels of smoke density exhausting from the engine.

In addition to the demanding requirements already alluded to, the combustor must be able to be re-lighted within specified altitudes. And when these engines are employed in lightweight aircraft, it is contemplated that the combustor will operate at lower than the levels of temperature rise associated with state-of-the-art combustors during engine deceleration and idle and will be required to be sufficiently stable in order to facilitate ground handling.

Future aircraft needs will require that engine weight and size will have to be reduced and this in turn requires that the combustor length must be likewise reduced. This reduction in combustor length tends to impact stability since it reduces residence time. This fact together with the fact that the combustor will be operated at an unprecedented wide range of temperature rise or fuel/air ratio contributes to a very difficult stability problem.

To gain better insight into the complexity and operability problems posed by high temperature rise combustors, it perhaps will be worthwhile comparing the requirements of the combustor with the stability characteristics of the combustion process. To this end, the graph which is a plot of fuel/air ratio vs. the stability correlation parameter is presented in FIG. 1. As is known, since most combustion occurs in the combustor's primary zone or region, this section of the combustor is selected for discussion purposes. The stability correlation parameter which has become a standard measurement in the combustor art contains the following terms applied to the primary zone:

V=Average through-flow velocity
P=Pressure level
T=Inlet Air Temperature

When these terms are combined in a dimensional parameter ($V/PT^2$) increasing velocity, decreasing pressure and/or decreasing temperature increases the stability parameter to higher levels. They likewise adversely affect the combustion process by making it more difficult for supporting combustion. Stated another way, higher values of the stability parameter are indicative of more severe and more difficult combustor operating requirements.

As is noted from an inspection of FIG. 1, the curve defines stability limit which is generated by increasing the severity of combustor operating conditions, and hence stability parameter, until blowout occurs for a range of fuel/air ratios. Hence, combustor conditions falling within the left-hand side of the parabola-shaped stability limit curve A will be stable and any conditions to the right of curve A will be unstable. Further, curve B defines an upper limit of fuel/air ratio and operations above this limit will exhibit excessive levels of smoke.

Hence, as is apparent from the foregoing in combustor operation for conventional, state-of-the-art combustors, the primary zone fuel/air ratios are set so that they fall below curve B and the engine deceleration, idle and altitude re-ignition requirements fall within the left-hand side (stable operation) of curve A. This is shown by curve C and altitude re-light operation is defined as operating point E, using as a standard an altitude of 30 thousand feet and the aircraft flight speed of 0.8 Mach Number as the point of re-ignition.

Curve F represents the combustor operations at increased levels of temperature rise contemplated for future advanced technology engines. Obviously, to assure combustion operation is below the smoke limit (curve B), the combustor air flow must likewise be increased, moving the combustor operating curve F closer to stability limit curve A, which obviously illustrates the increased severity of the operating requirements of the combustor. And, as noted, the deceleration and the altitude ignition represented by point G may fall outside of the stability limits (curve A). And what is indeed apparent, the trend is such that as temperature rise increases to a higher value, the combustor's operating line moves even to more severe requirements such that even the idle (points H and J on curves C and F, respectively) may likewise fall outside of the stability limit (curve A).

It is also important to understand the philosophy associated with the design of conventional combustors. As is well known, conventional combustors include at least two stages of air admission into the combustion zone, namely the combustion air and the dilution air. This inherently establishes three zones of burning and mixing, namely the primary, the intermediate and the dilution zones. Most of the combustion is attained in the primary zone and while it is desirable to achieve stoichiometric combustion in that zone, it nevertheless is always a compromise to achieve efficacious operation at the low power and high power conditions. Low power operation requires that the fuel/air mixture is as rich as possible so as to be able to attain low power operation and high power operation requires the fuel/air mixture to be as lean as possible to prevent the generation of excessive carbon.

As is known the primary zone is designed to provide a recirculation zone so as to sustain combustion. The air admitted into the primary zone (primary air) through the liner is mixed with fuel for combustion. A portion of the primary air isn't always captured by the recirculation zone and this air proceeds into the intermediate zone.

The intermediate zone provides a degree of carbon oxidization by mixing in the primary airflow that did not recirculate forward into the primary zone. Of course, the resulting temperature is still high enough for the oxidization process.

The dilution zone provides additional airflow and mixing length to cool the combustion products to a temperature level consistent with turbine capability. Owing to the technical development that has occurred over the years, the size of the combustor has been optimized so that the lengths of all the zones are at value that approaches the absolute minimum allowable values. Hence, it is apparent that any significant reduction in overall length requires increased aggressiveness in all zones which results in the primary air holes being closer to the dome and point of fuel injection. This degrades the stability limits because of reduced volume and fuel/air mixture residence time in the primary zone and moves the stability limit (curve A) to the left as indicated by the dash curve A' of FIG. 1.

We have found that we can obviate the problems noted above and achieve reduced combustor length and attain the stable operations in an increased temperature rise environment by combining single stage air admission with circumferential zoning.

SUMMARY OF THE INVENTION

An object of this invention is to provide an improved shortened annular combustor for a gas turbine engine.

A feature of this invention is to provide an improved annular combustor that combines circumferential zoning with single-stage air admission.

A still further feature of this invention is to provide an improved annular combustor that provides a non-uniform air and/or fuel flow into the primary zone so that the overall fuel/air ratio is higher than heretofore known combustors and that a sector is operated at a lower airflow and/or fuel flow to be stable in the overall operating range of the combustor so as to stabilize and propagate combustion and that one of the two stages of airflow (combustion and dilution airflow) is eliminated.

A still further feature of this invention is to provide an improved aircraft engine's annular combustor that is characterized as being of reduced length, relatively inexpensive to fabricate, lighter than heretofore known combustors and capable of operation over a higher temperature rise.

The foregoing and other features and advantages of the present invention will become more apparent from the following description and accompanying drawings.

BEST MODE FOR CARRYING OUT THE INVENTION

For the sake of simplicity and convenience the details of the annular combustor and the gas turbine engine are eliminated from this description and for details thereof reference should be made to the F100 and JT9D family of engines manufactured by Pratt & Whitney division of United Technologies Corporation, the assignee of this patent application. Suffice it to say that the invention has particular utility in aircraft gas turbine engines utilizing annular combustors and more importantly for combustors where the temperature rise is at significantly high values.

Figure 1:
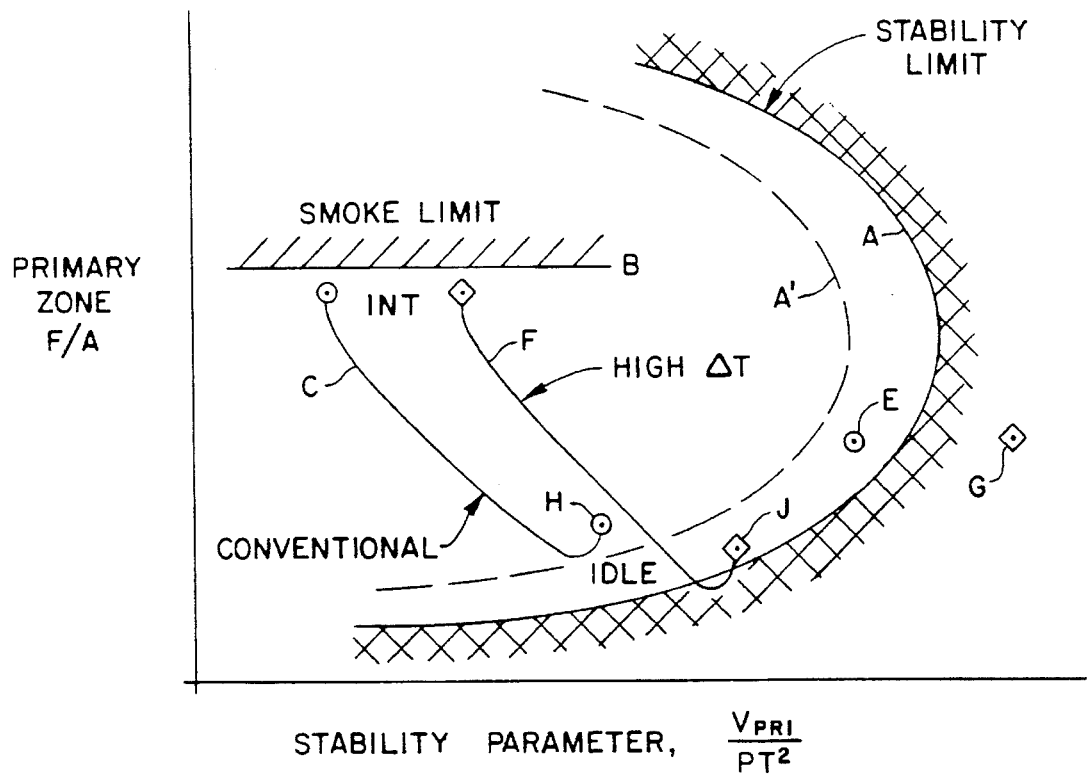
FIG. 1 is a graph where fuel/air ratio is plotted against the stability parameter typifying the combustor operation, the stability limit and the smoke limit.
Figure 2:
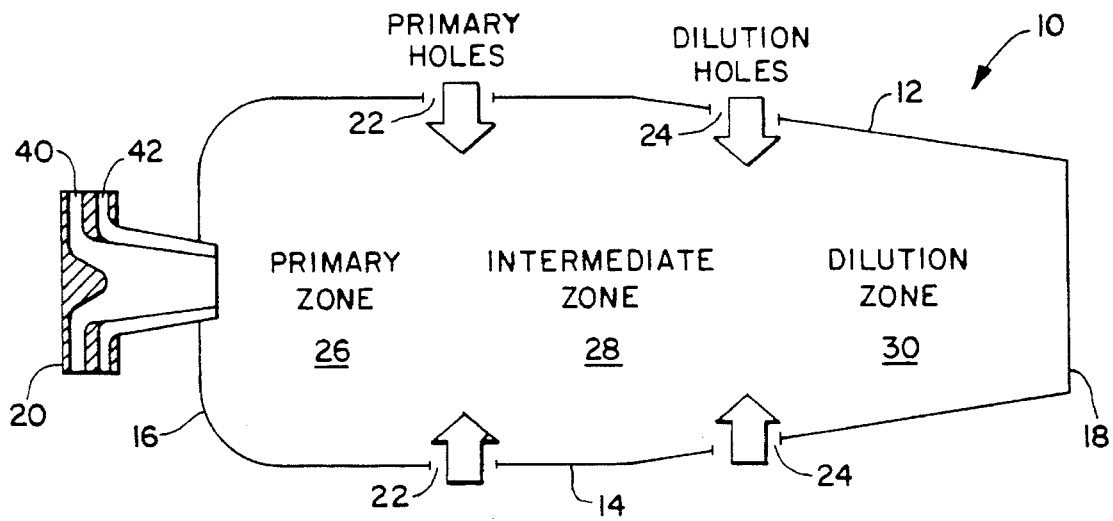
FIG. 2 is a view in schematic of a two-stage three-zone combustor illustrating the prior art.

The typical gas turbine engine comprises a compressor section, diffuser section, combustion section, turbine section and exhaust section where air ingested into the engine's inlet is compressed by the compressor, diffused, accelerated and heated in the combustor by the combustion process and exhausted through the exhaust nozzle for powering the aircraft. The accelerated heated air passes through the turbine where energy is extracted to drive the compressor. As shown in FIG. 2, the prior art annular combustor generally indicated by reference numeral 10 comprises an outer annular liner member 12, an inner annular liner member 14, a dome 16, and an exit end 18 for delivering accelerated heated engine working medium to the turbine (not shown). A plurality of fuel nozzles 20 (only one being shown) is circumferentially spaced and supported in dome 16. As shown, the combustor includes openings 22 in the outer and inner liners 12 and 14 respectively for admitting combustion air radially into the combustion chamber and opening 24 also in the outer and inner liners 12 and 14 respectively for admitting dilution air into the combustion chamber.

As is apparent from the foregoing, the two-stage air admission combustor effectively divides the combustor into three zones, namely the primary zone 26, the intermediate zone 28 and the dilution zone 30. Obviously, the overall length of the combustor can be reduced, which has been heretofore recognized, by eliminating one of the air admission stages. However, from past experience, this has proven to be impractical because the single stage admission holes had to be increased to admit larger amounts of air to enhance complete combustion and to reduce the gas temperature to acceptable values to maintain the turbine's integrity. The consequence of this higher volume of airflow produced a large amount of air recirculating in the primary zone where the combustor operation became unstable in the low power operating regime because of the exceedingly lean fuel/air mixture.

Figure 3:
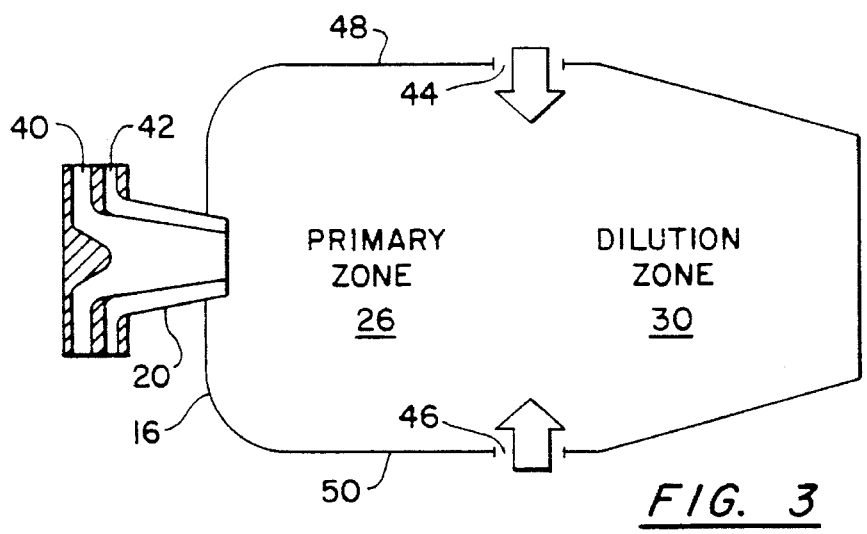
FIG. 3 is a view in schematic of a single-stage two-zone combustor.

According to this invention, the stability problems of the single stage air admission annular combustor can be obviated by utilizing the non-uniform flow distribution in the primary zone. This is illustrated in FIG. 3 which schematically is similar to the combustor shown in FIG. 2 except for the elimination of one of the air admission zones. The like parts will use like reference numerals. As can be seen the use of a single stage of air admission divides the combustor into a primary zone 26 and dilution zone 30. Each of the plurality of fuel nozzles 20 carries air passages 44 and 46 and typically includes swirlers that impart a swirling motion to the air as it is admitted into the combustion zone. These fuel nozzles 20 are likewise mounted in the dome and are circumferentially spaced. A portion of the air passages 40 and 42 in the fuel nozzle and 44 and 46 in the outer annular wall 48 and the inner annular wall 50 is discretely sized to define a sector in the combustor which is supplied with a reduced level of airflow.

Figure 4:
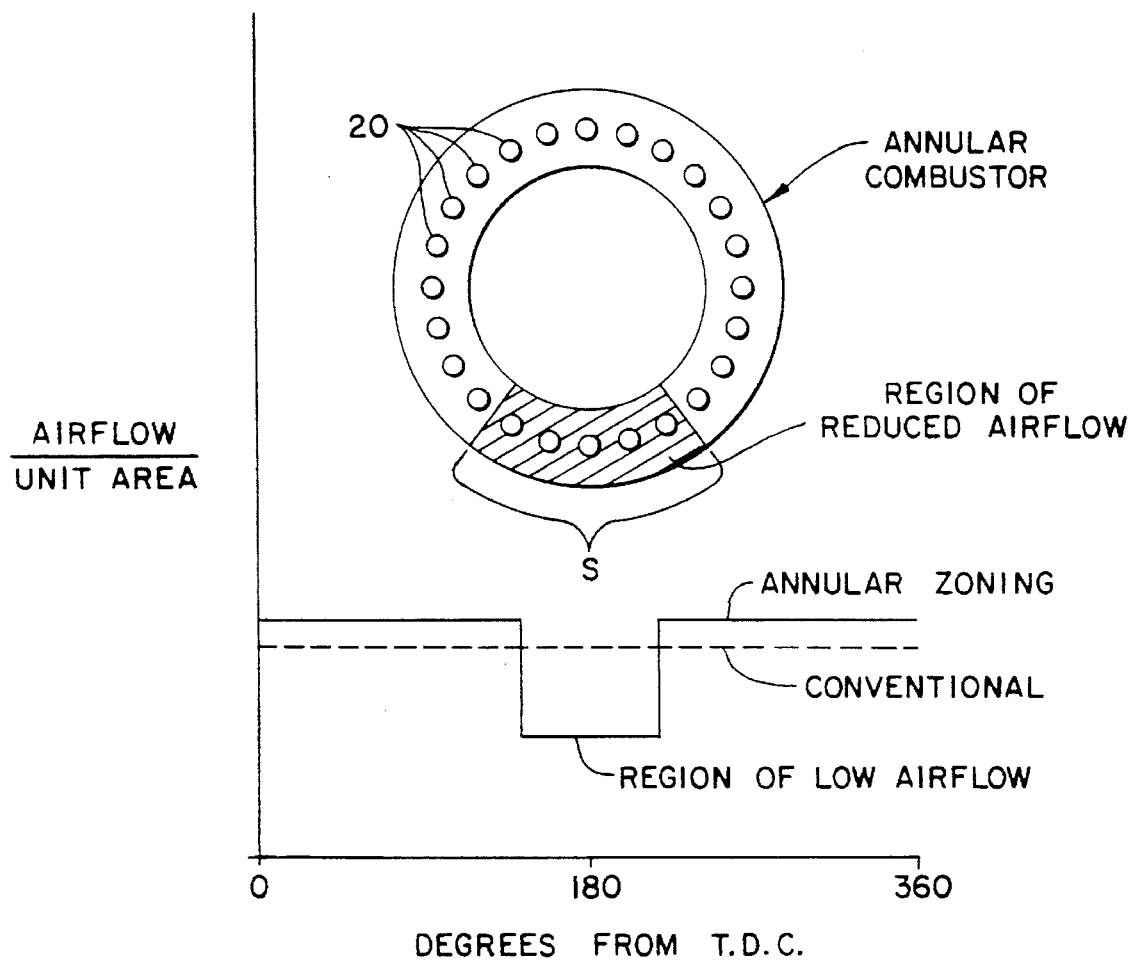
FIG. 4 is a view in schematic and graphical illustration of a non-uniform flow of the combustor at the primary zone.

This is best illustrated in FIG. 4 that schematically illustrates the arrangement of the fuel nozzles and the circumferential distribution of the airflow. As noted, the segment portion of the circumference identified as reference letter S includes a plurality of air admission openings 40, 42, 44 and 46 to reduce the distribution of the airflow to a lesser value than the distribution of the airflow being admitted to the remainder of the circumference.

Figure 5:
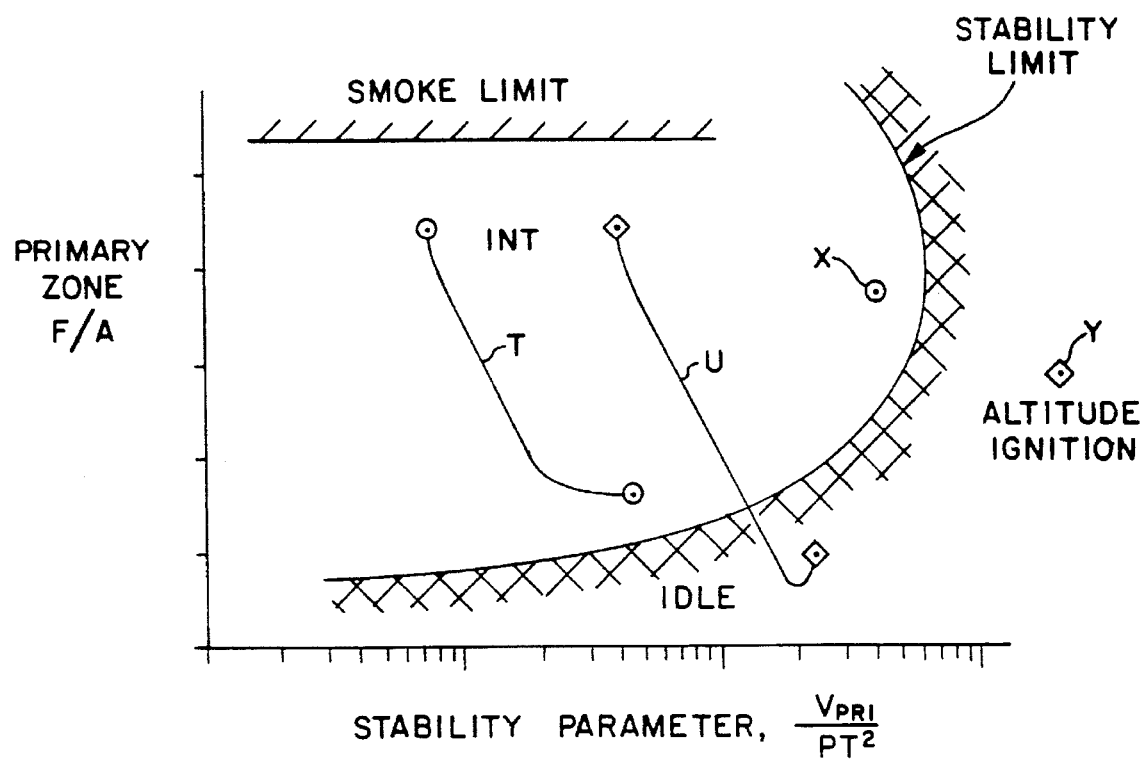
FIG. 5 is a graph similar to FIG. 1 showing the operating requirements of the high and low airflow regions of the combustor employing this invention.

Curves T and U of FIG. 5 show the operating requirements for intermediate power, decel-to-idle and points X and Y show the ignition at the altitude of 30,000 feet of the low and high airflow region, respectively, of the combustor illustrated in FIG. 4. As noted a portion of curve U (the highly loaded portion) and point Y exceeds the stability limits while curve T and point X always remain within the limits. This is because the stability requirements are not as severe as in the high airflow region and low power fuel/air enrichment may be employed in the low airflow region to avoid exceedingly lean operation. Hence, whenever the stability limits of the high airflow region are exceeded sufficient mixing at the interface of the high airflow and the low airflow regions is such that the combustibles in the low airflow region will sustain combustion within both regions.

It is contemplated that in the event the combustion efficiency is below a given requirement, during these unstable operating conditions, the fuel supply to the fuel nozzles in the high airflow region remote from the interface may be turned off and the fuel flow attendant these now closed fuel nozzles will be diverted to the fuel nozzles in the high airflow region nearer the interface. This will increase the localized fuel/air ratio and bring them into the stability limits.

To achieve uniformity of the temperature of the combustor gases at the exit end of the combustor during the high power operation, it is contemplated that the fuel flow distribution of the fuel nozzles will be tailored to match the airflow distribution. Uniformity of the exit temperature during low power operation may not be achievable but since the overall temperature is at a much lower value this condition is not deleterious.

What has been shown by this invention is an annular combustor that affords a reduced length than heretofore known annular combustors and yet capable of higher temperature rise than heretofore known combustors.

Although this invention has been shown and described with respect to detailed embodiments thereof, it will be understood by those skilled in the art that various changes in form and detail thereof may be made without departing from the spirit and scope of the claimed invention.

We claim:

1. An annular combustor for a gas turbine engine having an outer elongated annular liner, an elongated annular inner liner, a dome mounted at the forward end interconnecting said outer liner and said inner liner for defining therewith a combustion chamber, a plurality of fuel nozzles circumferentially spaced and mounted in said dome for feed fuel into said combustion chamber, the fuel nozzles including air inlet openings for admitting air into said combustion chamber, a portion of said air inlet openings having a smaller opening than the remaining of said air inlet openings spanning said circumference defining a sector in the circumference with smaller openings than the remaining circumference of the annular combustion chamber, said annular combustor consisting of a plurality of openings circumferentially spaced in said inner liner and said outer liner about a transverse plane defining a single-stage air admission, a portion of said single-stage air admission dimensioned to admit a lesser amount of air into said combustion chamber than the remaining openings of said single stage air admission, said portion of said air inlet openings and said portion of said single stage air admission defining a sector in the combustor having an airflow distribution that creates a stable combustion zone even when the remaining portion of said combustor is unstable.

2. An annular combustor for a gas turbine engine which is supplied with pressurized air, said annular combustor having an outer annular liner and an inner annular liner defining an annular combustion zone, a dome mounted on the front ends of said inner annular liner and said outer annular liner closing said front end, said remote end of said dome being opened to flow combustion gases, a plurality of fuel nozzles having swirl air passages mounted in said dome and circumferentially spaced for leading a portion of said pressurized air into said combustion chamber, said inner and said outer liner consisting of a single row of openings circumferentially spaced about a transverse plane for admitting another portion of said pressurized air into said combustion chamber, a portion of said swirl air passages and a portion of said single row of openings being dimensioned to admit a reduced level of airflow of said portions of pressurized air to a sector of said combustor so that sector remains stable for all operating conditions and in operating conditions where the remainder of the combustor is unstable.

\* \* \* \* \*